US005649780A

United States Patent [19]

Schall

[11] Patent Number: 5,649,780

[45] Date of Patent: Jul. 22, 1997

[54] COLLET FOR TELESCOPING ASSEMBLY

[75] Inventor: Frederick Schall, Mt. Laurel, N.J.

[73] Assignee: Delair Group Incorporated, Delair, N.J.

[21] Appl. No.: 384,017

[22] Filed: Feb. 6, 1995

[51] Int. Cl.[6] .......... F16B 7/10

[52] U.S. Cl. .......... 403/109; 403/370; 403/371; 403/377

[58] Field of Search .......... 403/370, 371, 403/368, 367, 365, 373, 374, 377, 104, 109

[56] References Cited

U.S. PATENT DOCUMENTS

| | | | |
|---|---|---|---|
| 2,279,324 | 4/1942 | Pallen | 403/109 X |
| 3,003,149 | 10/1961 | Grashow | 403/371 X |
| 3,253,136 | 5/1966 | Faul | 403/371 X |
| 3,284,114 | 11/1966 | McCord, Jr. et al. | 403/370 |
| 3,781,908 | 12/1973 | Tullos | 403/104 X |
| 4,089,612 | 5/1978 | Mazzeo | 403/359 X |
| 4,948,149 | 8/1990 | Lin et al. | 403/104 X |
| 5,011,104 | 4/1991 | Fang | 403/104 X |
| 5,417,511 | 5/1995 | Warden | 403/109 |

FOREIGN PATENT DOCUMENTS

| | | | |
|---|---|---|---|
| 599359 | 6/1994 | European Pat. Off. | 403/370 |

*Primary Examiner*—Harry C. Kim
*Attorney, Agent, or Firm*—Louis Weinstein

[57] ABSTRACT

A collet assembly for telescoping pole structures and the like including inner and outer collet members. The inner collet member is mounted upon a first pole and includes a plurality of integral flexible fingers. The inner collet member is staked to the pole by deforming small sections thereof into spaces between the flexible fingers. The outer collet member has a tapped interior threadedly engaging a tapped exterior portion of the inner collet member, which threaded portion is spaced inward from the free ends of the flexible fingers. An interior peripheral portion of the outer collet member is tapered to urge the fingers radially inwardly when the outer collet member is threaded onto the inner collet member. A collet ring is positioned within an annular recess collectively formed by recesses provided along the interior periphery of each of the fingers and is pressed against a second tube telescoped into the collet assembly when the outer collet member is tightened onto the inner collet member. The tube engaged by the collet ring has an OD which is less than the ID of the tube staked to the inner collet ring and adjustably telescopes into and out of the staked tube. An appropriate tool piece is mounted to the free end of the smaller diameter tube such as, for example, a paint brush, a pool skimmer or any other suitable tool member.

20 Claims, 3 Drawing Sheets

COLLET FOR TELESCOPING ASSEMBLY

FIELD OF THE INVENTION

The present invention relates to adjusting telescoping assemblies which provide positive locking and prevent slippage of the telescoping assembly.

BACKGROUND OF THE INVENTION

Telescoping assemblies are used for a wide variety of applications such as vacuum cleaning poles, telescopic poles used for painting, and the like. Such telescoping assemblies typically utilize a plastic collet having a portion of which was glued to the exterior of the larger diameter pole and is provided with integral fingers in direct contact with the inner pole of smaller diameter. The glue joint has presented a problem yielding inconsistent adhesion and is labor consuming in addition to yielding poor results. In addition, the fingers have been found to slip on the smaller diameter tube causing the pole to collapse.

BRIEF DESCRIPTION OF THE INVENTION

The present invention is characterized by comprising a collet assembly specially adapted for use in telescoping poles assemblies and which is characterized by comprising an inner collet member having a plurality of resilient fingers arranged at spaced intervals and separated by elongated slots. The inner collet is telescoped onto the larger diameter tube, the inner collet being staked onto one end of the larger diameter tube by outwardly deforming the tube and forcing portions thereof into the inward ends of slots provided between the resilient fingers. A threaded portion is provided about an intermediate portion of the outer periphery of the inner collet.

An outer collet member is provided with a tapped interior portion which threadedly engages the threaded portion of the inner collet. A portion of the outer collet inner periphery adjacent to the tapped interior has a tapered configuration, causing the resilient fingers to be urged radially inwardly when the outer collet is rotated in the direction to tighten the outer collet onto the inner collet.

A recess is provided along the inner periphery of each flexible finger, these recesses collectively providing an annular-shaped recess for positioning and seating a flexible collet ring which is compressed between the inwardly pressing fingers and the outer periphery of the smaller diameter tube which telescopes into the inner and outer collets and the larger diameter telescoping tube, the tightening of the outer collet upon the inner collet firmly locking the inner and outer diameter tubes at a desired relative axial position.

The threaded portion arranged about the outer periphery of the inner collet has at least one gap region aligned with a longitudinal axis of the inner collet to provide region(s) for dirt or other foreign particles to trap out of the threaded portion and thereby prevent or reduce the likelihood of the collet assembly to binding.

The collet assembly is easy to use, adjust and readjust and securely grips the inner tube to the outer tube and prevents slippage therebetween.

OBJECTS OF THE INVENTION

It is therefore one object of the present invention to provide a novel collet assembly for use in telescoping assemblies and the like comprised of inner and outer threadedly engaging collet members which firmly grip an inner telescoping tube when tightened to secure the inner tube in position relative to a cooperating outer tube which has the inner collet members staked thereto.

Another object of the present invention is to provide a novel collet assembly for telescoping assemblies and the like comprised of threadedly engaging inner and outer collet members, the inner collect member having resilient fingers which are urged against the smaller diameter tube of the telescoping assembly as the outer collet member is tightened onto the inner collet member.

Still another object of the present invention is to provide a novel collet assembly for telescoping assemblies and the like being of the type described hereinabove and having at least one axially aligned gap in the threaded portion to facilitate the trapping out of dirt and other foreign matter to prevent binding of the cooperating threaded portions.

Still another object of the present invention is to provide a collet assembly of the type described hereinabove for use with telescoping assemblies wherein the outer tube upon which the inner collet member is mounted is deformed at one end thereof so as to be forced into cooperating slots in the inner collet member to provide a strong and accurate mounting of the inner collet member on the outer tube.

Still another object of the present invention is to provide a collet assembly of the type described for use with telescoping assemblies and wherein the resilient fingers are each provided with a recess, which recesses collectively form an annular recess for positioning and seating a collet ring for firmly engaging the inner tube of the telescoping assembly when the collet assembly is tightened.

The above as well as other objects of the present invention will become apparent when reading the accompany description and drawings in which:

Figure 1:
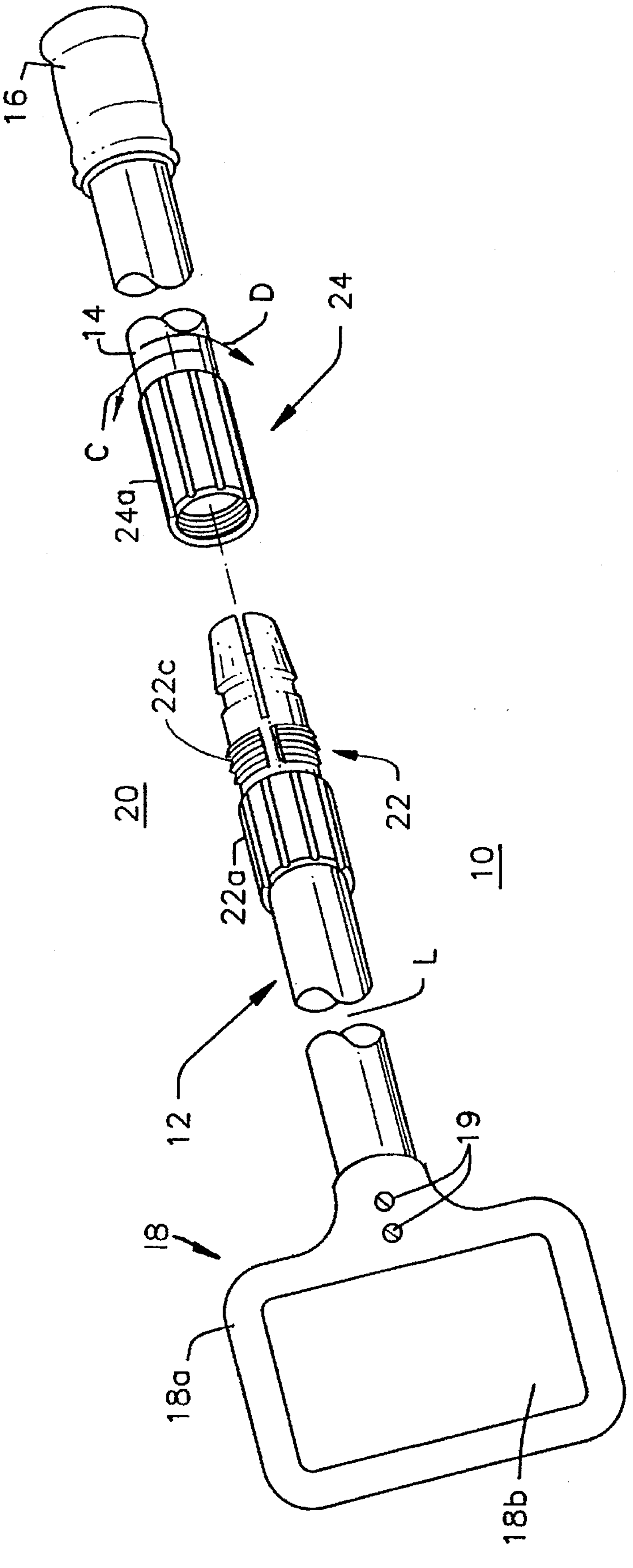
FIG. 1 is a perspective view, partially exploded, of a telescoping assembly incorporating the novel collet assembly of the present invention.
Figures 2, 2A, 2B, 2C:
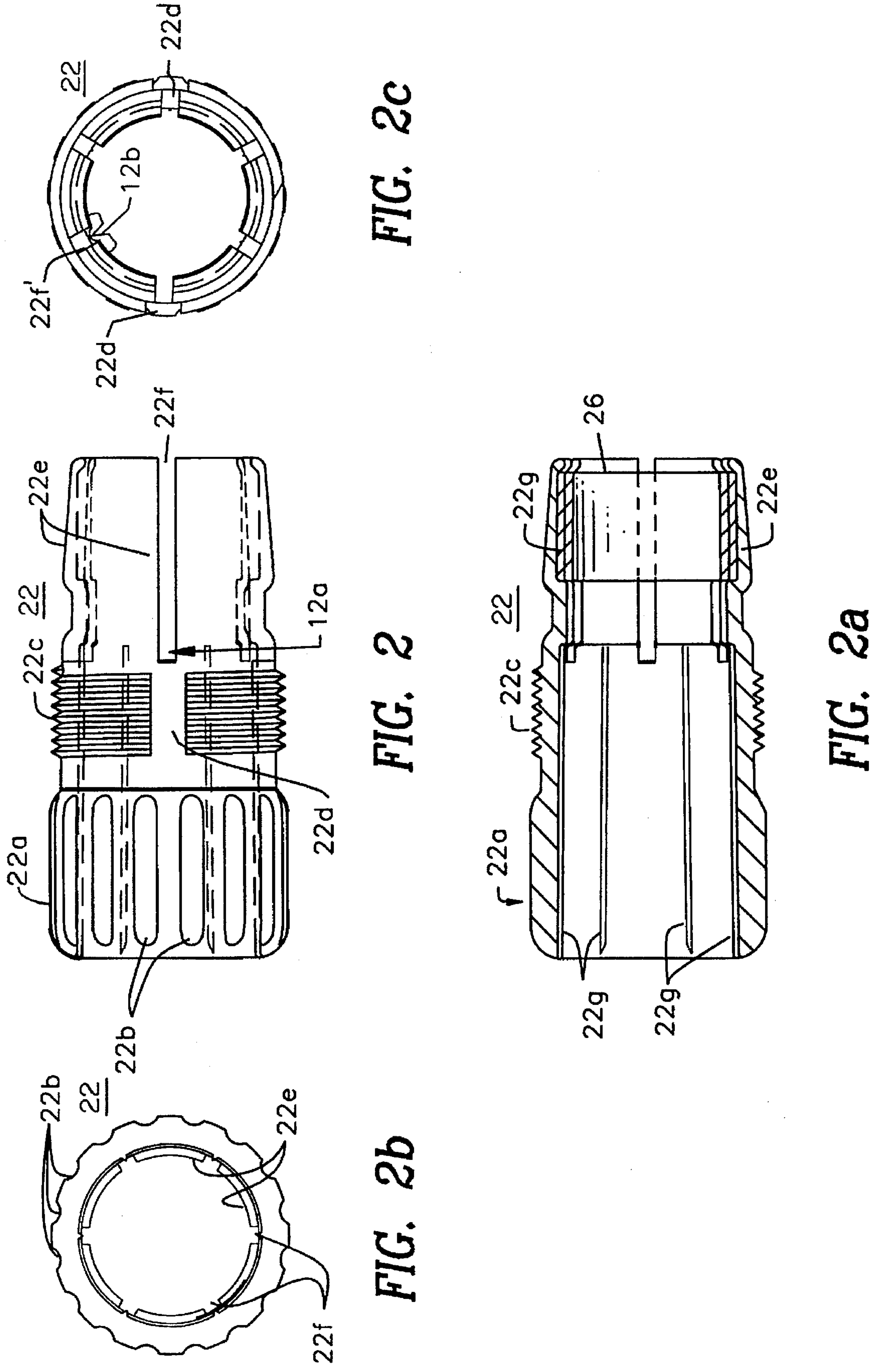
FIG. 2 shows a detailed side view of the inner collet member employed in the assembly of FIG. 1.
Figure 3C:
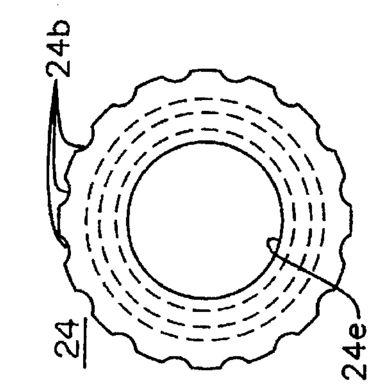
Figure 3:
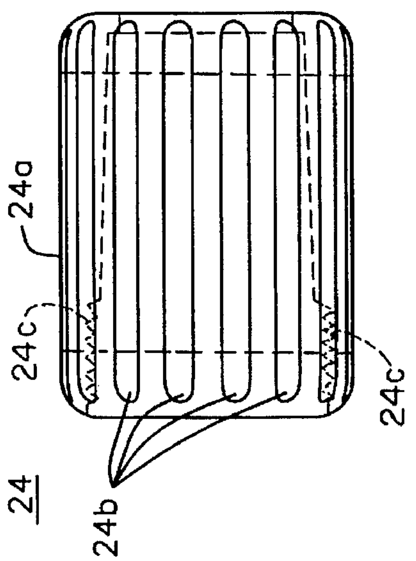
Figure 4:
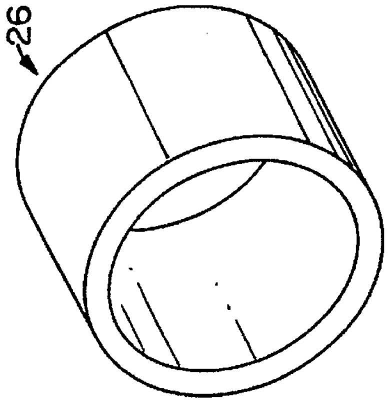

FIG. **2*a* shows a sectional profile of the inner collet member shown in FIG. 2**;

FIGS. **2*b* and 2*c* are end views of the inner collet member showing the respective left and right-hand ends of FIG. 2**;

FIG. 3 is a side view of the outer collet member employed in the collet assembly of FIG. 1;

FIG. **3*a* is a sectional view of the outer collet member shown in FIG. 3**;

FIGS. **3*b* and 3*c* are end views of the outer collet member showing the respective left and right-hand ends of FIG. 3; and FIG. 4 is a perspective view of a collet ring employed in the collet assembly of FIG. 1**.

DETAILED DESCRIPTION OF THE INVENTION AND PREFERRED EMBODIMENTS THEREOF

FIG. 1 shows a telescoping assembly 10 embodying the novel collet assembly 20 of the present invention. Some of the components thereof are shown in exploded fashion.

The telescoping assembly 10 is comprised of a hollow, larger diameter tube 12 and a hollow, smaller diameter tube 14 which telescopes into tube 12, as well as telescoping into the collet assembly 20, as will be better understood from the ensuing description.

The right-hand end of small diameter tube 14 is preferably provided with a handle portion 16, which may be a molded plastic member to facilitate gripping. The outer periphery of each of tubes 12 and 14 is also preferably provided with shallow, elongated grooves arranged in spaced parallel fashion and being substantially perpendicular to a longitudinal axis L of the telescoping assembly.

Telescoping assembly 10 may be employed for a variety of applications. One such application is shown in FIG. 1 and is comprised of a skimmer assembly 18 which is secured to the left-hand end of larger diameter tube 12 by suitable fastening members 19. The skimmer 18 is substantially comprised of a frame **18*a* which is secured to tube 12 and supports a screen or filter-like sheet 18*b* typically used for skimming a swimming pool, whirlpool tub or the like. Other working implements may be either fixedly or removably fastened to tube 12** to perform other activities such as painting, pool skimming and vacuuming equipment, dusting and cleaning attachments and the like.

The telescoping assembly is capable of being extended or reduced in length and is easily adjusted through the use of the novel collet assembly 20 which is comprised of an inner collet member 22, a collet ring 26 (see FIG. 4) and an outer collet member 24. The collet ring 26, shown in greater detail in FIG. 4, is positioned and seated within resilient fingers of the inner collet member 22, as will be more fully described.

Inner collet member 22, which is shown in greater detail in FIGS. 2 through **2*c*, is a substantially annular-shaped member having an outer peripheral portion 22*a* which is knurled, i.e. provided preferably with elongated spaced parallel grooves 22*b*** to facilitate gripping. If desired any other type of knurled surface may be utilized.

Intermediate the left- and right-hand ends of member 22 and to the right of knurled portion **22*a*, member 22 is provided with a threaded portion 22*c* for threaded engagement with the inner periphery of outer collet member 24**, as will be more fully described hereinbelow.

Figure 3A:
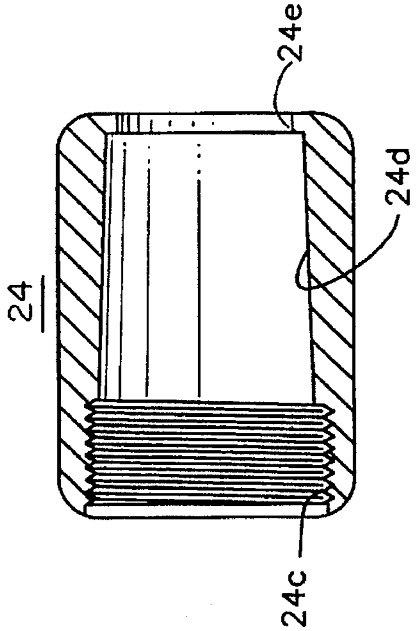
Figure 3B:
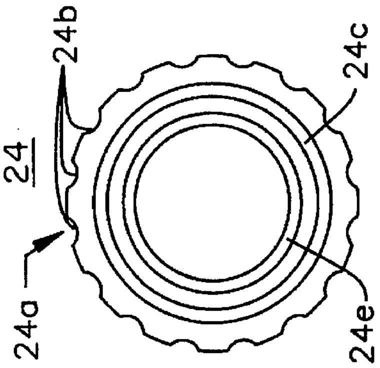

A pair of diametrically opposed recesses **22*d*, shown best in FIGS. 2 and 2*c*, and preferably aligned substantially parallel to the longitudinal axis L, provide gaps within the threaded portion 22*c* to enable dirt or other foreign or extraneous matter which may collect within the grooves of threaded portions 22*c* and 24*c* (see FIG. 3*a*) to trap out and thereby prevent binding between the engaging threaded portions of members 22 and 24**.

Additional gaps may be provided, if desired. Also a lesser number may be provided if desired. However, it is preferable that two such gaps be provided.

The right-hand end of inner collet member 22 is provided with a plurality of resilient fingers **22*e* integral with the main body of member 22 and extending toward the right, as shown in FIG. 2**.

The fingers are spaced from one another by elongated slots **22*f*, which slots serve to define the sides of fingers 22*e* and also provide for staking of the inner collet member upon outer tube 12**, as will be more fully described hereinbelow.

Each of the fingers **22*e* is provided with an elongated, shallow recess 22*g* along the inner periphery of each finger. The recesses 22*g* collectively provide a substantially annular-shaped recess for positioning and seating collet ring 26, shown best in FIG. 4**, which ring is a continuous cylindrical-shaped flexible plastic member, preferably formed of flexible PVC of a durameter of 75 shore A, although other materials having similar characteristics may be utilized.

Collet ring 26 is pressed into the interior of inner collet member 22 and is snap-fittingly received within the cooperating recesses **22*g* as shown in FIG. 2*a***.

Inner collet member 22 has a plurality of thin, elongated inwardly directed projections **22*g*** extending in an inward radial direction.

Inner collet member 22 is mounted onto tube 12 by inserting the right-hand end of tube 12 into the left-hand end of member 22 so that the projections form a force-fitting engagement with tube 12. The right-hand end **12*a* of tube 12 is arranged so as to be positioned slightly beyond the left-hand end of each slot 22*f*. The tube 12, which is preferably formed of aluminum, is pressed outwardly and is deformed at the location of each of the slots 22*f* so as to at least partially enter into the base of each slot, i.e. the end of each slot 22*f* remote from and spaced inwardly from the right-hand end of member 22, as shown in FIG. 2. The portion 12*b* of tube 12 which is pressed into slot 22*f* is shown in FIG. 2*c*. Only one such deformed section 12*b* has been shown in FIG. 2*c* for purposes of simplicity, it being understood that a like deformed portion is provided at each and every one of the slots 22*f*. If desired, at least three such deformations should be provided although a deformation at each slot is preferable. Deforming the right-hand end 12*a* of tube 12 in this manner provides a collet member 22 which is staked onto tube 12 in a very firm and accurate manner. Each deformed portion exerts an outward force. Collectively these outward forces maintain the collet 22 accurately aligned on tube 12** so that their respective longitudinal axes are colinear.

Outer collet member 24, shown best in FIG. 3 through **3*c*, is a substantially annular-shaped member having an knurled outer periphery 24*a*, namely a plurality of shallow, elongated grooves 24*b* arranged in spaced parallel fashion, to facilitate gripping. The interior periphery of outer collet member 24 has a threaded portion 24*c* at its left-hand end and a tapered portion 24*d* at its right-hand end and terminates in an inwardly directed lip 24*e***.

The manner in which the inner collet member 22 is mounted to tube 12 has been described hereinabove. After the end **12*a* of tube 12 is deformed in the manner shown in FIG. 2*c*, the smaller diameter tube 14 is inserted through outer collet member 24, inner collet member 22 and into outer tube 12. Outer collet member 24 is then mounted onto inner collet member 22 so that the threaded portions 22*d* and 24*c* are in threaded engagement. Outer collet member 24 is then twisted or rotated in the direction shown by arrow C (see FIG. 1) causing the resilient fingers 22*e* to enter into the tapered region 24*d* which urges the fingers 22*e* radially inwardly and toward the outer periphery of smaller diameter tube 14. The inwardly-directed forces of resilient fingers 22*e* press the inner periphery of collet ring 26 firmly against the outer periphery of smaller diameter tube 14. The more the outer collet member is tightened relative to the inner collet member, the greater the holding force applied to tube 14. When the outer collet member is found to be suitably "finger-tight", the clamping force applied by the collet assembly 20 to tube 14 is more than sufficient to hold the tubes 12, 14** at the desired axial position relative to one another for use in a particular activity such as painting, skimming a swimming pool, etc.

Readjustment may be made simply by loosening outer collet member 24, repositioning tube 14 relative to tube 12 and then retightening outer collet member 24 relative to member 22.

Any dirt or other foreign matter which may collect in the grooves of threaded portions **22*c* and 24*c* is trapped out of the grooves by the recesses 22*d* to prevent binding between members 22 and 24**.

The collet members are formed of a rugged plastic material, such as for example ABS which is able to withstand the rigors of all types of weather and climates and thus is extremely advantageous for outdoor use and storage. The collet assembly, in one preferred embodiment, is employed for use with elongated, telescoping aluminum tubes and in which the tube 12 has an outer diameter of the order of 1.25 inches, the outer peripheries of knurled portions 22*a* and 24*a* being respectively of the order of 1.7 and 2 inches to facilitate gripping, loosening and tightening operations.

The tightening of the collet assembly causes the fingers to exert compressive forces against the elastomeric ring 26 to securely grip tube 26 and to prevent slippage. The collet design of the present invention is easy to use and provides a simple and yet rugged design.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. In combination, a telescoping assembly having hollow tubular members of respectively smaller and larger diameters and a collet assembly for use with the telescoping assembly comprising:

inner and outer collet members;

said inner collet member having a hollow interior for telescopingly receiving one end of said larger diameter hollow tubular member;

said inner collet member having a plurality of integral flexible resilient fingers extending outwardly and away from an end of the tubular member telescoped into said inner collet member;

said inner collet member having a threaded portion arranged about an outer periphery thereof and intermediate opposing ends of said inner collet member and spaced from said resilient fingers;

said outer collet member having a hollow interior;

a first portion of said hollow interior being tapped for threaded engagement with the threaded portion of said inner collet member;

a second portion of said hollow interior of said outer collet member adjacent said tapped portion gradually tapering inwardly;

said tapered portion engaging an outer periphery of said fingers for urging said resilient fingers in an inward radial direction toward an outer periphery of said smaller diameter tubular member telescopingly received by said inner collet member for securement thereby when said inner and outer collet members are in threaded engagement and rotated relative to one another to move said fingers along said tapered portion; and a free end of the outer collet member having an integral, inwardly extending flange which, together with the outer collet member, completely surrounds and encloses free ends of said resilient fingers to shield said fingers even when the outer collet member is tightened on said inner collet member to secure the smaller and larger diameter tubular members to one another.

2. The combination according to claim 1 wherein an outer portion of said outer collet member is knurled to facilitate holding and gripping thereof.

3. The combination of claim 2 wherein said knurled outer portion is comprised of shallow, elongated grooves arranged in spaced-parallel fashion about the outer periphery of said outer collet member.

4. The combination of claim 1 wherein a portion of an outer portion of said inner collet member is knurled to facilitate handling and gripping thereof.

5. The combination of claim 4 wherein said knurled outer portion is comprised of shallow, elongated grooves arranged in spaced parallel fashion about the outer periphery of said inner collet member.

6. The combination according to claim 1 wherein the threaded portion arranged about said outer periphery of said inner collet member is provided with at least one gap portion of a constant width aligned substantially parallel to a longitudinal axis of said inner collet member to enable extraneous matter which may collect in grooves of the threaded portions of said inner and outer collet members to be trapped out through said gap portion.

7. The combination according to claim 1 wherein said resilient fingers are spaced apart by elongated slots;

the larger diameter tubular member telescoped into said interior of said inner collet member having an end thereof being deformed outwardly at positions aligned with a base portion of at least some of said elongated slots so as to at least partially enter said slots to firmly and accurately clamp said inner collet member to said larger diameter tubular member whereby said collet member is staked thereon.

8. The combination according to claim 1 wherein a portion of the hollow interior of said inner collet member is provided with a plurality of equi-spaced inwardly directed projections for force-fittingly engaging said larger diameter tubular member.

9. The combination of claim 8 wherein said projections are elongated projections arranged in spaced-parallel fashion.

10. The combination according to claim 1 wherein said inner and outer collet members are formed of ABS.

11. In combination, a telescoping assembly having hollow tubular members of respectively smaller and larger diameters and a collet assembly for use with the telescoping assembly comprising:

inner and outer collet members;

said inner collet member having a hollow interior for telescopingly receiving one end of said larger diameter hollow tubular member;

said inner collet member having a plurality of integral flexible resilient fingers extending outwardly and away from an end of the tubular member telescoped into said inner collet member;

said inner collet member having a threaded portion arranged about an outer periphery thereof and intermediate opposing ends of said inner collet member;

said outer collet member having a hollow interior;

a first portion of said hollow interior being tapped for threaded engagement with the threaded portion of said inner collet member;

a second portion of said hollow interior of said outer collet member adjacent said tapped portion gradually tapering inwardly;

said tapered portion for urging said resilient fingers in an inward radial direction toward an outer periphery of said smaller diameter tubular member telescopingly received by said inner collet member for securement thereby when said inner and outer collet members are in threaded engagement and rotated relative to one another to move said fingers along said tapered portion;

a hollow tubular collet ring arranged to be grasped by inner peripheries of said flexible fingers for exerting a clamping force directly on said smaller diameter tube telescoping received therein to facilitate clamping thereof.

12. The combination according to claim 11 wherein an inner periphery of each of said flexible fingers is provided with an elongated recess, the recesses of said flexible fingers collectively forming a substantially annular-shaped recess for receiving and seating said collet ring.

13. The combination according to claim 11 wherein said collet ring is formed of a soft, resilient material.

14. The combination according to claim 13 wherein said collet ring is formed of a flexible plastic.

15. The combination according to claim 14 wherein said flexible plastic is flexible PVC.

16. The combination according to claim 11 wherein said collet ring is formed of a flexible plastic material having a durameter of the order of 75 shore A.

17. The combination according to claim 11 wherein said collet ring is provided with a cylindrical inner periphery for engaging an outer periphery of said larger diameter tubular member to provide a gripping force extending over substantially the inner periphery of said collet ring.

18. A telescoping assembly comprising:

an elongated larger diameter hollow tubular member;

a smaller diameter tubular member telescoped into one end of said large diameter tubular member;

a collet assembly for use with said telescoping assembly comprising:

inner and outer collet members;

said inner collet member having a hollow interior for telescopingly receiving one end of said larger diameter tubular member;

said inner collet member having a plurality of integral flexible resilient fingers extending outwardly and away from an end of the larger diameter tubular member telescoped into said inner collet member;

said inner collet member having a threaded portion arranged about an outer periphery thereof and intermediate opposing ends of said inner collet member and spaced from said resilient fingers;

said outer collet member having a hollow interior;

a first portion of said hollow interior being tapped for threaded engagement with the threaded portion of said inner collet member;

a second portion of said hollow interior of said outer collet member adjacent said tapped portion gradually tapering inwardly;

a free end of the outer collet member having an inwardly extending flange which, together with the outer collet member, completely surrounds and encloses free ends of said resilient fingers to shield said fingers even when the outer collet member is tightened on said inner collet member to secure the smaller and larger diameter tubular members to one another;

said tapered portion urging said resilient fingers in an inward radial direction toward an outer periphery of said smaller diameter tubular member received by said inner collet member for securement thereby when said inner and outer collet members are in threaded engagement and rotated relative to one another to move said fingers along said tapered portion; and a member for performing an activity being secured to an end of said one of said tubular members remote from said collet assembly.

19. A telescoping assembly according to claim 18 wherein said tubular members are formed of aluminum.

20. A telescoping assembly according to claim 18 wherein an end of a remaining one of said tubular members is provided with a gripping handle.

* * * * *